Patented Oct. 4, 1932

1,881,219

UNITED STATES PATENT OFFICE

WILLIAM HENRY MOSS AND BLANCHE BABETTE WHITE, OF CUMBERLAND, MARYLAND, ASSIGNORS TO CELANESE CORPORATION OF AMERICA, A CORPORATION OF DELAWARE

PLASTIFIER FOR CELLULOSE DERIVATIVES AND RESIN COMPOSITIONS

No Drawing. Application filed August 16, 1928. Serial No. 300,152.

This invention relates to the production of films, plastics and coating compositions, such as lacquers, containing cellulose derivatives, resin and plastifiers.

An object of this invention is to provide suitable plastifiers for cellulose derivative and resin compositions.

A particular object is to provide plasticizers for toluene sulphonamide-formaldehyde resin and cellulose acetate compositions.

In the use of cellulose derivatives such as cellulose acetate for the production of plastics and lacquer, the plastic composition or the film forming constituents of the lacquer usually consist of the cellulose derivative, one or more plastifiers and one or more resins. In the preparation of a pigmented lacquer film, the proportion of either the plastifiers alone or of the resin alone may be greater than that of the cellulose derivative. For the preparation of a useful lacquer film, it is necessary that all of the components thereof should be mutually compatible or form a clear homogeneous solid solution in the final lacquer film.

It is a matter of general observation that when the cellulose derivative is compatible with the resin alone and with the plasticizer alone, it will be compatible with a mixture of plastifier and resin. However, there are certain exceptions to this rule, and it is an important matter in the art of making lacquer, to know to what extent the various three component mixtures of cellulose ester, resin and plasticizer are completely compatible.

In the preparation of lacquers containing organic derivatives of cellulose such as cellulose acetate, the formulation becomes much more difficult than with other cellulose derivatives, because cellulose acetate is compatible with only a limited number of resins and also with fewer plastifiers than other cellulose derivatives. When it is desired to put both a plastifier and a resin with the acetate in the relatively large quantities as demanded by a lacquer, it is found that the number of entirely compatible compositions of cellulose acetate, resin and plasticizer are very limited.

In a pigmented lacquer, the finely divided pigment in suspension throughout the lacquer introduces further complications and a three component mixture of cellulose acetate, resin and plastifier, which gives a clear homogeneous lacquer film, may have its mutual compatibility destroyed, so that one or other of the components separates out when a pigment is ground in with the clear lacquer.

We have found that compositions containing cellulose acetate and toluene sulphonamide-formaldehyde resin are particularly difficult to plastify. Some of the commonly used plastifiers for cellulose acetate, such as diethyl phthalate and tricresyl phosphate are quite unsuitable for use with a mixture of cellulose acetate and toluene sulphonamide formaldehyde resin. The addition of such plastifiers to the acetate-resin mixture even in such small proportion as 10% of the weight of the film forming materials, causes the lacquer film made from it to show a partial separation or bloom of one of the components on the surface of the film. This separation does not always appear during the drying of the film but may be delayed one or two days. It is also more pronounced when some pigments, such as Prussian Blue, are in the film than with others, such as chrome yellow. As a result of this separation or blooming, the films are unsatisfactory and worthless in appearance, and have poor outdoor resistance.

We have found that certain other plastifiers are quite suitable as plastifiers, and are compatible with the cellulose acetate-resin mixture in large proportions and have the usual beneficial effects of a plastifier or softener on the film.

In accordance with our invention, we prepare coating or plastic compositions containing organic derivatives of cellulose, resin of the toluene sulphonamide type, and a plastifier compatible therewith. Examples of such compatible plastifiers are diphenylol propane, mono methyl xylene sulfonamide, ethyl toluene sulfonamide and triacetin.

By organic derivative of cellulose we mean organic esters of cellulose, such as cellulose acetate, cellulose propionate, cellulose formate or cellulose butyrate and cellulose ethers, such as methyl cellulose, ethyl cellulose, benzyl cellulose.

The resin of the toluene sulphonamide type may be formed by heating toluene sulphonamide with an aldehyde such as formaldehyde or other compounds having a mobile methylene group. This resin may be formed by heating equi-molecular proportions of toluene sulphonamide, and formaldehyde in the old manner. The resin employed may also be made by heating the resin formed by prior processes to a temperature of 200-260° C., as described in our co-pending application #300,154 filed on even date herewith. The resin may also be prepared by condensing toluene sulphonamide and formaldehyde in the presence of urea, as described in said application.

Suitable low medium and/or high boiling solvents may be added and other resins, both natural resins or synthetic resins, such as phenol-formaldehyde resin, diphenylol propane-formaldehyde, or phenol-furfural resin may be added. Also fire retardants, especially the bromine derivatives of organic compounds, such as brominated tricresyl phosphate may be added if desired. Pigments and dyes may be incorporated when these compatible plastifiers are used.

In order to further illustrate our invention, the following specific examples of film-forming compositions are given:

*Example I*

| | Parts |
|---|---|
| Cellulose acetate | 20 |
| Toluene sulphonamide resin | 20 |
| Diphenylol propane | 20 |
| Pigment | 10 |
| Acetone | 100 |
| Alcohol | 50 |
| Diacetone alcohol | 30 |

*Example II*

| | Parts |
|---|---|
| Cellulose acetate | 10 |
| Toluene sulphonamide resin | 12.5 |
| Mono methyl xylene sulphonamide | 8 |
| Acetone | 100 |

*Example III*

| | Parts |
|---|---|
| Cellulose acetate | 10 |
| Toluene sulphonamide resin | 5 |
| Triacetin | 3 |
| Acetone | 100 |
| Ethyl acetate | 50 |
| Benzyl alcohol | 5 |

It is to be understood that the foregoing detailed description is given merely by way of example, and that many variations may be made therein without departing from the spirit of our invention.

Having described our invention, what we claim and desire to secure by Letters Patent is:

1. A coating composition containing cellulose acetate, a toluene sulphonamide-aldehyde resin, and a plastifier selected from the group consisting of triacetin, diphenylol propane, monomethyl xylene sulphonamide and ethyl toluene sulphonamide.

2. A coating composition containing an organic derivative of cellulose, a toluene sulphonamide-formaldehyde resin, and a plastifier selected from the group consisting of triacetin, diphenylol propane, monomethyl xylene sulphonamide and ethyl toluene sulphonamide.

3. A coating composition containing cellulose acetate, a toluene sulphonamide-formaldehyde resin, and a plastifier selected from the group consisting of triacetin, diphenylol propane, monomethyl xylene sulphonamide and ethyl toluene sulphonamide.

4. A composition of matter containing an organic derivative of cellulose, a toluene sulfonamid-aldehyde resin, and a plastifier selected from the group consisting of triacetin, diphenylol propane, monomethyl xylene sulfonamid and ethyl toluene sulfonamid.

In testimony whereof, we have hereunto subscribed our names.

WILLIAM HENRY MOSS.
BLANCHE BABETTE WHITE.